US009822712B2

(12) United States Patent
Weber et al.

(10) Patent No.: US 9,822,712 B2
(45) Date of Patent: Nov. 21, 2017

(54) FOUR-CYLINDER ENGINE WITH TWO DEACTIVATABLE CYLINDERS

(71) Applicant: Ford Global Technologies, LLC, Dearborn, MI (US)

(72) Inventors: Carsten Weber, Leverkusen (DE); Martin Wirth, Remscheid (DE); Rainer Friedfeldt, Huerth (DE); Guenter Bartsch, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 867 days.

(21) Appl. No.: 14/274,424

(22) Filed: May 9, 2014

(65) Prior Publication Data
US 2014/0245993 A1 Sep. 4, 2014

Related U.S. Application Data

(63) Continuation-in-part of application No. PCT/EP2012/072173, filed on Nov. 8, 2012.

(30) Foreign Application Priority Data

Nov. 10, 2011 (GB) .................................. 1119370.3
Feb. 8, 2012 (EP) .................................. 12154407

(51) Int. Cl.
*F02D 9/02* (2006.01)
*F02D 17/02* (2006.01)
(Continued)

(52) U.S. Cl.
CPC ............. *F02D 17/02* (2013.01); *F02D 13/06* (2013.01); *F02D 41/0087* (2013.01);
(Continued)

(58) Field of Classification Search
CPC ...... F02D 17/02; F02D 41/0087; F02D 13/06; F02D 41/0082; F02D 2041/0012;
(Continued)

(56) References Cited

U.S. PATENT DOCUMENTS 4,086,762 A 5/1978 Sakurai et al.
5,255,641 A 10/1993 Schechter
(Continued)

FOREIGN PATENT DOCUMENTS

CN 1715620 A 1/2006
CN 102099558 A 6/2011
(Continued)

OTHER PUBLICATIONS

Partial Translation of Office Action of Chinese Application No. 2012800666416, dated Dec. 30, 2015, State Intellectual Property Office of PRC, 9 Pages.
(Continued)

*Primary Examiner* — Hung Q Nguyen
(74) *Attorney, Agent, or Firm* — Julia Voutyras; McCoy Russell LLP

(57) ABSTRACT

A method for operating an internal combustion engine is provided. The method includes during a first operating condition, operating two primary cylinders and two secondary cylinders to perform combustion, the two primary and secondary cylinders arranged in an inline configuration, the two primary cylinder adjacent to one another, the two secondary cylinders adjacent to one another, and the secondary cylinders positioned 175°-185° out of phase relative to the two primary cylinders and during a second operating condition, selectively deactivating the two secondary cylinders to perform combustion in only the two primary cylinders.

18 Claims, 9 Drawing Sheets

(51) Int. Cl.
*F02D 13/06* (2006.01)
*F02F 1/24* (2006.01)
*F02F 1/40* (2006.01)
*F01P 3/02* (2006.01)
*F02B 75/18* (2006.01)
*F02D 41/00* (2006.01)
*F02D 41/02* (2006.01)
*F02B 37/00* (2006.01)
*F02B 37/02* (2006.01)

(52) U.S. Cl.
CPC ............... *F02F 1/243* (2013.01); *F02F 1/40* (2013.01); *F01P 2003/021* (2013.01); *F01P 2003/028* (2013.01); *F02B 37/001* (2013.01); *F02B 37/025* (2013.01); *F02B 2075/1816* (2013.01); *F02D 41/0082* (2013.01); *F02D 41/0245* (2013.01); *F02D 2041/0012* (2013.01); *Y02T 10/18* (2013.01)

(58) Field of Classification Search
CPC ......... F02D 41/0245; F02F 1/40; F02F 1/243; Y02T 10/18; F02B 37/025; F02B 37/001; F02B 2075/1816; F01P 2003/021; F01P 2003/028
See application file for complete search history.

(56) References Cited

U.S. PATENT DOCUMENTS

| | | | | |
|---|---|---|---|---|
| 6,460,337 | B1* | 10/2002 | Olofsson | F01L 1/26 123/316 |
| 7,142,727 | B2* | 11/2006 | Notovitz | G06K 9/3283 358/538 |
| 2001/0050070 | A1* | 12/2001 | Xu | F02B 17/005 123/295 |
| 2003/0101961 | A1 | 6/2003 | Foster | |
| 2005/0111997 | A1 | 5/2005 | Smith et al. | |
| 2008/0141971 | A1 | 6/2008 | Park et al. | |
| 2008/0308050 | A1 | 12/2008 | Kuhlbach et al. | |
| 2009/0042458 | A1* | 2/2009 | Kinoshita | B63B 35/731 440/1 |
| 2011/0302917 | A1* | 12/2011 | Styles | F02B 37/025 60/602 |
| 2014/0041382 | A1* | 2/2014 | Weber | F02B 37/002 60/602 |

FOREIGN PATENT DOCUMENTS

| | | |
|---|---|---|
| CN | 201982174 U | 9/2011 |
| DE | 2024041 A1 | 12/1971 |
| DE | 102008035957 A1 | 2/2010 |
| DE | 102009008742 A1 | 8/2010 |
| GB | 215999 A | 5/1924 |
| JP | S58169133 A | 10/1983 |
| JP | S6355337 A | 3/1988 |
| JP | S6388232 A | 4/1988 |
| JP | 2001248464 A | 9/2001 |
| JP | 2001329873 A | 11/2001 |
| WO | 2009129894 A1 | 10/2009 |
| WO | 2010006321 A2 | 1/2010 |
| WO | 2010015654 A1 | 2/2010 |

OTHER PUBLICATIONS

Partial Translation of Office Action of Chinese Application No. 201210447190.2, dated Jan. 29, 2016, State Intellectual Property Office of PRC, 90 Pages.

Partial Translation of Office Action of Chinese Application No. 201310046153.5, dated Mar. 4, 2016, State Intellectual Property Office of PRC, 11 Pages.

* cited by examiner

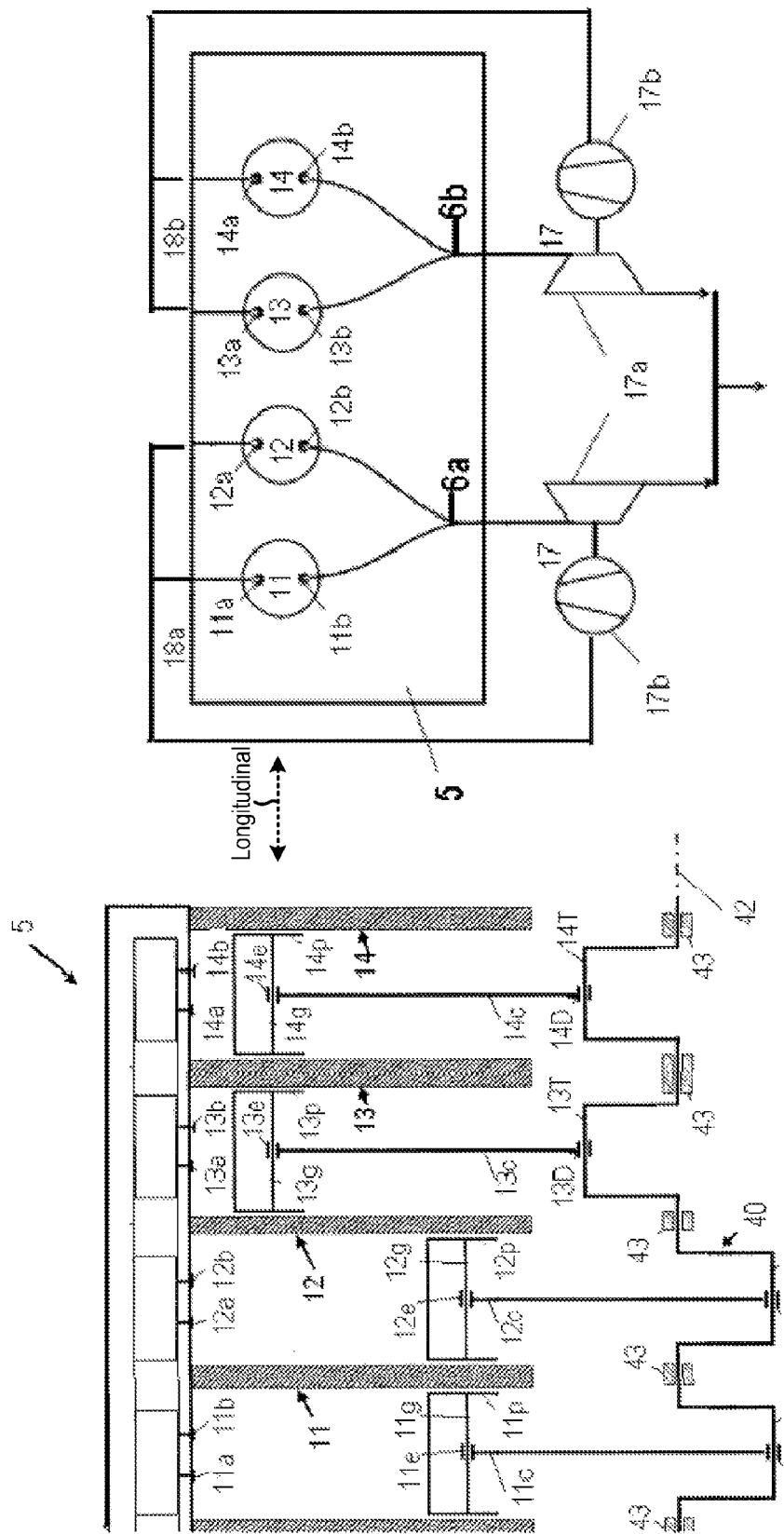

| Crankshaft angle degrees | Cylinder 11 | Cylinder 12 | Cylinder 13 | Cylinder 14 |
|---|---|---|---|---|
| 0 | TDC | TDC | BDC | BDC |
|   | Induction | Working | Compression | Exhaust |
| 180 | BDC | BDC | TDC | TDC |
|   | Compression | Exhaust | Working | Induction |
| 360 | TDC | TDC | BDC | BDC |
|   | Working | Induction | Exhaust | Compression |
| 540 | BDC | BDC | TDC | TDC |
|   | Exhaust | Compression | Induction | Working |
| 720 | TDC | TDC | BDC | BDC |

Fig. 6a

| Crankshaft angle degrees | Cylinder 11 | Cylinder 12 | Cylinder 13 | Cylinder 14 |
|---|---|---|---|---|
| 0 | TDC | TDC | BDC | BDC |
|   | Induction | Working | Exhaust | Compression |
| 180 | BDC | BDC | TDC | TDC |
|   | Compression | Exhaust | Induction | Working |
| 360 | TDC | TDC | BDC | BDC |
|   | Working | Induction | Compression | Exhaust |
| 540 | BDC | BDC | TDC | TDC |
|   | Exhaust | Compression | Working | Induction |
| 720 | TDC | TDC | BDC | BDC |

Fig. 6b

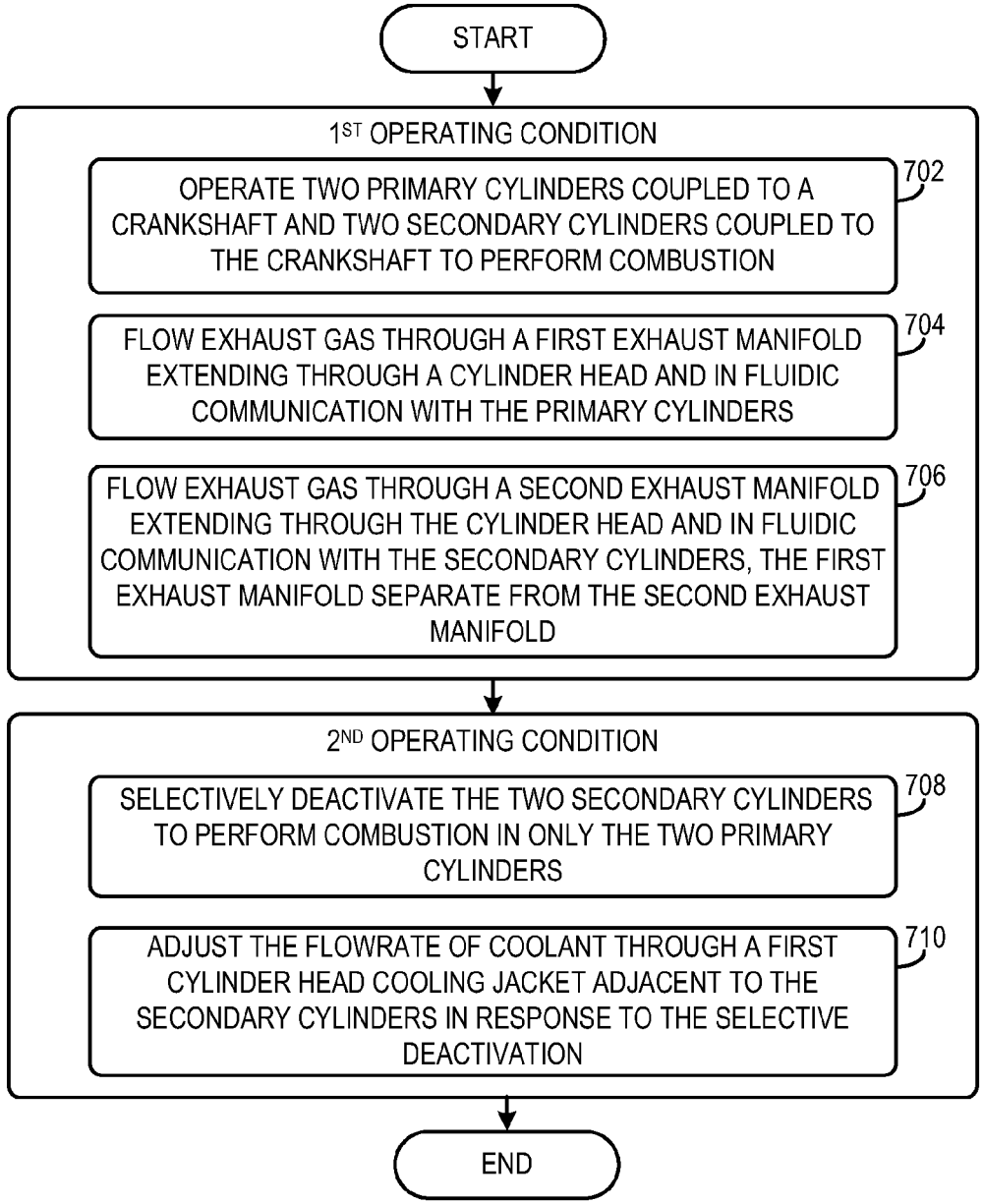

FOUR-CYLINDER ENGINE WITH TWO DEACTIVATABLE CYLINDERS

CROSS REFERENCE TO RELATED APPLICATIONS

This application is a continuation-in-part of International Patent Application Serial Number PCT/EP2012/072173, "A FOUR-CYLINDER ENGINE WITH TWO DEACTIVATABLE CYLINDERS," filed Nov. 8, 2012, which claims priority to G.B. Patent Application Serial Number 1119370.3, "A THREE CYLINDER ENGINE WITH A DEACTIVATABLE CYLINDER," filed Nov. 10, 2011, and also claims priority to European Patent Application Serial Number 12154407.6, "MULTI-CYLINDER INTERNAL COMBUSTION ENGINE AND METHOD FOR OPERATING A MULTI-CYLINDER INTERNAL COMBUSTION ENGINE OF SAID TYPE," filed Feb. 8, 2012, the entire contents each of which are hereby incorporated by reference for all purposes.

FIELD

The present disclosure relates an internal combustion engine, and especially a four-cylinder in-line piston engine in which two cylinders can be deactivated in order to improve the fuel consumption.

BACKGROUND AND SUMMARY

Internal combustion engines may operate at a level of power output far below that which it can produce. Such a partial load operation often causes the engine to operate at a level of thermal efficiency far below that which the engine can achieve. As a result, the fuel efficiency is compromised. Thus, engines may not be operated close to the maximum operating efficiency during certain operating conditions.

The Inventors have recognized the aforementioned problems and developed a method for operating an internal combustion engine. The method includes during a first operating condition, operating two primary cylinders coupled to a crankshaft and two secondary cylinders coupled to the crankshaft to perform combustion, the two primary and secondary cylinders arranged in an inline configuration, the two primary cylinder adjacent to one another, the two secondary cylinders adjacent to one another, and the secondary cylinders positioned 175°-185° out of phase relative to the two primary cylinders with regard to a crank angle. The method further includes during a second operating condition, selectively deactivating the two secondary cylinders to perform combustion in only the two primary cylinders. In this way, cylinders in the engine may be deactivated during certain operating conditions to enable the power output of the engine to better match load demands in the vehicle, if desired. As a result, engine operation may be improved. Moreover, disabling the cylinders with this type of cylinder arrangement enables exhaust gas interference in the exhaust system to be substantially eliminated, thereby improving combustion efficiency. Additionally, deactivating the cylinders in this way may enable exhaust treatment devices in the exhaust downstream of the cylinders to reach a desirable operating temperature more quickly due to the higher temperature combustion performed in the active cylinders. As a result, engine emissions can be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 2 shows a schematic cross section through a four-cylinder in-line engine according to a first example;

FIG. 3 shows a schematic plan view onto the arrangement of two exhaust gas turbochargers on the engine;

FIGS. 6a and 6b show alternative timing diagrams for the engine shown in FIGS. 1-3; and FIG. 7 shows a flowchart of a method for operation of an internal combustion engine.

DETAILED DESCRIPTION

Figure 1:
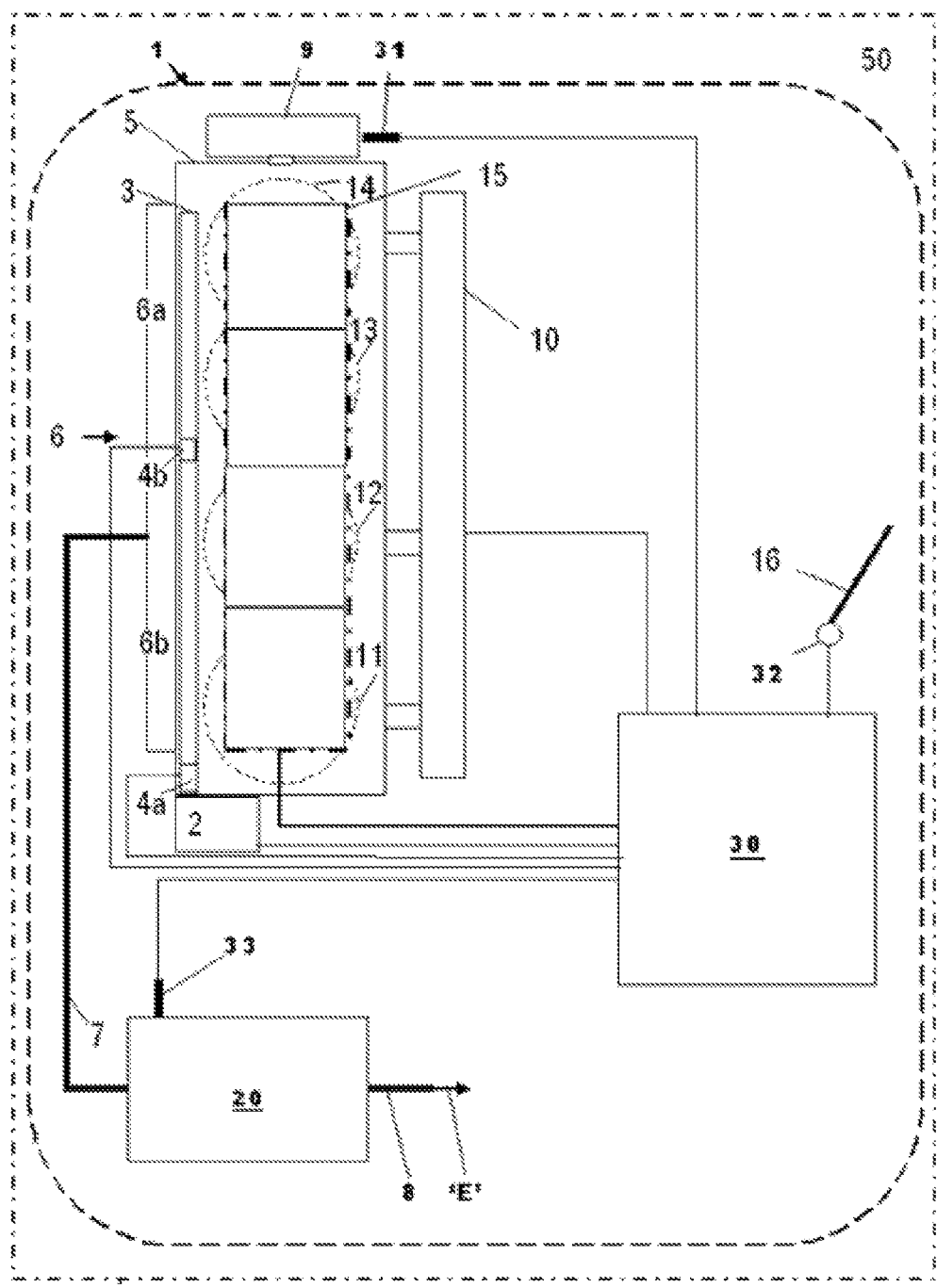
FIG. 1 shows a block diagram that shows an engine system according to a second example.

If an exhaust treatment device such as a catalytic converter, a NOx trap, a soot trap, etc., is coupled to the engine in order to reduce emissions from the engine, it is also normally desirable to heat the exhaust treatment device to above a temperature at which it is sufficiently active to carry out its designated function, such a temperature often being referred to as the "start-up temperature" or "light-off temperature". If, however, an engine is operating under low or partial load, wherein all cylinders are operating, the exhaust gas temperature is relatively low compared to that which is generated if the engine is operating under full load. The Inventors have therefore recognized that another advantage of selective cylinder deactivation is that by deactivation of one of the cylinders the exhaust gas temperature of the remaining working cylinders can be increased, whereby the time is reduced that any exhaust gas treatment devices needed to achieve a desired start-up temperature following starting from the cold state.

It will be appreciated that the engine described herein may provide a four-cylinder engine with improved fuel efficiency. In one example, a four-cylinder in-line reciprocating piston internal combustion engine is provided, in which an outer cylinder and the adjacent inner cylinder are operated (together referred to as primary cylinders) and two further adjacent cylinders in series therewith are operated as deactivatable (secondary cylinders). Each of the cylinders accommodates a respective piston such that the piston can slide, the piston being operatively connected by a respective connecting rod to a respective crank of a crankshaft with four cranks.

According to another aspect of the engine, the volume of the exhaust manifold may be significantly reduced, if desired. The dynamic wave processes or pressure fluctuations in the exhaust system are the reason that the thermodynamically offset working cylinders of a multi-cylinder internal combustion engine influence each other during a gas exchange, and especially can also impair each other. A poorer torque characteristic or a reduced power range can be the result. If the exhaust pipes of the individual cylinders are led separately from each other for a longer distance, the mutual influence of the cylinders during a gas exchange can be counteracted. However, the latter causes a degraded response characteristic of the turbocharger. The evacuation of the combustion gases from a cylinder of the internal combustion engine during the gas exchange is essentially based on two different mechanisms. If the exhaust valve opens close to bottom dead center at the start of the gas exchange, the combustion gases flow at high speed through the outlet opening into the exhaust system because of the high pressure level occurring towards the end of the combustion in the cylinder and the related high pressure difference between the combustion chamber and the exhaust tract. Said pressure-driven flow process is accompanied by a high pressure peak, which is also referred to as a pre-exhaust shock and propagates along the exhaust pipe at the speed of sound, wherein the pressure falls (i.e., is reduced), more or less strongly with increasing distance and depending on the routing of the pipe as a result of friction.

In the further course of the gas exchange, the pressures in the cylinder and in the exhaust pipe may substantially equalize, so that the combustion gases are largely expelled as a result of the reciprocating motion of the piston.

Depending on the specific embodiment of the exhaust gas discharge system, the pressure waves emanating from a cylinder not only pass through the at least one exhaust pipe of said cylinder, but rather also through the exhaust pipes of the other cylinders and potentially up to the opened exhaust opening provided at the end of the respective pipe.

During the gas exchange, exhaust gas already discharged or led out into an exhaust pipe can thus pass into the cylinder again and indeed inter alia as a result of the pressure wave emanating from another cylinder.

In order to avoid the exhaust pipes of the individual cylinders being led separately from each other for a longer distance, the exhaust pipes of four-cylinders are combined to form an exhaust manifold. The exhaust pipes of the cylinders may be combined in stages. Specifically, the exhaust pipes may be combined such that at least one exhaust pipe of an outer cylinder and the at least one exhaust pipe of the adjacent inner cylinder are combined to form a partial exhaust pipe and both partial exhaust pipes of the two groups of cylinders formed in this way are combined to form an overall exhaust pipe. In this way, the overall distance of all exhaust pipes and the volume of the exhaust pipe can be reduced, if desired. In addition, a turbocharger with charged air feed designed for the respective groups of cylinders can be disposed for each of the groups of cylinders. The response characteristic of the turbocharger can be improved by using two mutually parallel disposed turbochargers with suitable small turbine cross sections. This may be advantageous if the groups of cylinders comprise different displacements. The turbines may comprise a variable geometry, so that regulation of the turbine geometry in respect of low and high revolution rates and also for low and high loads can take place.

The exhaust pipes can thereby be partially or fully integrated within the at least one cylinder head. The exhaust pipes or partial exhaust pipes are together sometimes referred to as an exhaust manifold.

The previously described problem relating to the mutual influence of the cylinders during a gas exchange is of increasing relevance to the structural design of internal combustion engines, because when designing the exhaust manifold a trend towards short exhaust pipes can be observed. Therefore, the exhaust pipes of the cylinders may be shortened, starting from the respective exhaust opening up to the collection point in the exhaust manifold at which the exhaust pipes are combined into a common overall exhaust pipe and at which the hot exhaust gas of the cylinders is collected, e.g., to integrate the exhaust manifold essentially within the at least one cylinder head and to carry out the combination of the exhaust pipes to an overall exhaust pipe within the cylinder head. On the one hand this results in a more compact construction of the internal combustion engine and a denser packaging of the whole drive unit in the engine compartment. On the other hand, cost advantages arise during manufacture and assembly as well as a weight reduction, especially with full integration of the exhaust manifold within the cylinder head.

Furthermore, shorter exhaust pipes can have a beneficial effect on the arrangement and the operation of an exhaust gas treatment system that is provided downstream of the cylinder. The path of the hot exhaust gases to the exhaust gas treatment systems may be shortened so that the exhaust gas is given little time for cooling and the exhaust gas treatment systems reach their working temperature or start-up temperature quickly, especially following a cold start of the internal combustion engine.

In this connection efforts are being made to reduce the thermal inertia of the segment of the exhaust pipes between the exhaust opening at the cylinder and the exhaust gas treatment system, which can be achieved by reducing the mass and the length of said segment, i.e. by shortening the corresponding exhaust pipes.

In the case of internal combustion engines charged by exhaust gas turbochargers, it may be desirable to dispose the turbine close to the exhaust, i.e., to the exhaust openings of the cylinders, in order in this way to be able to exploit the exhaust gas enthalpy of the hot exhaust gases, which are substantially determined by the exhaust gas pressure and the exhaust gas temperature, and to provide a rapid response characteristic of the turbocharger. The thermal inertia and the volume of the pipe system between the exhaust openings of the cylinders and the turbine may also be decreased, for which reason in turn the shortening of the pipes of said pipe system is purposeful, e.g., through at least partial integration of the exhaust manifold within the cylinder head.

The exhaust manifold may be integrated within the cylinder head in order to participate in cooling provided in the cylinder head and so as not to have to manufacture the manifold from thermally highly resistant materials, which are cost-intensive.

The shortening of the exhaust pipes of the exhaust manifold, e.g., by integration in the cylinder head, has—as described above—has a number of advantages, but besides the shortening of the overall distance of all exhaust pipes also results in a shortening of the individual exhaust pipes, because these are already combined immediately downstream of the exhaust openings, whereby the problem of the mutual interference of the cylinders during a gas exchange is intensified.

For example, with a four-cylinder in-line engine whose cylinders are operated with the ignition sequence 1-3-4-2, short exhaust pipes can also result in the fourth cylinder adversely affecting the third cylinder that precedes it in the ignition sequence, i.e., the previously ignited cylinder, during the gas exchange and in exhaust gas emanating from the fourth cylinder passing into in the third cylinder before its exhaust valves close.

Another aspect of the engine described herein may be an engine having a crankshaft. In this aspect the cylinders of a group of cylinders may run mechanically identically (i.e., pass through top dead center and bottom dead center at the same point in time). For this purpose, the associated cranks of the two cylinders may not comprise an offset in the circumferential direction about the longitudinal axis of the crankshaft. The thermodynamic offset of 360° KW is then implemented by the ignition sequence.

In order to implement a respective ignition separation of 180° KW in relation to the totality of the four-cylinders, the cranks of one group of cylinders are rotated relative to the cranks of the other group of cylinders, i.e., are offset, in the circumferential direction by 180°. The angle may be 180° in terms of mass balancing, but can readily lie between 175° and 185°, for example.

In one example, the internal combustion engine described herein may be an internal combustion engine having a compact exhaust manifold with short exhaust pipes and at the same time eliminating the problem of mutual interference of the cylinders during a gas exchange.

An internal combustion engine may also include two cylinder heads if e.g., eight cylinders are disposed distributed on two banks of cylinders. The combination of the exhaust pipes in the two cylinder heads can also be used to improve the gas exchange and to improve the range of torques.

The exhaust pipes of the cylinders of a group (primary cylinders or secondary cylinders) are thereby combined into respective partial exhaust pipes within the cylinder head, for example. The exhaust manifold is then of modular construction and comprises a manifold segment integrated within the cylinder head, namely two part exhaust manifolds, and an external manifold or manifold segment.

The exhaust gas flows of the partial exhaust pipes of the primary cylinders may be kept separate from the exhaust gas flows of the partial exhaust pipes of the secondary cylinders at least until exiting the cylinder head, so that the exhaust system exits the cylinder head in the form of two exhaust openings. The partial exhaust pipes may be combined into an overall exhaust pipe downstream of the cylinder head and thus only outside the cylinder head. This can take place upstream or downstream of exhaust gas treatment or exhaust gas turbocharging.

The secondary cylinders may be deactivated in order to increase the temperature of the exhaust gases emanating from the engine, of the lubricating oil flowing through the engine and/or of the coolant flowing through the engine.

The supply of the primary cylinders with coolant can be regulated by a flow control valve (e.g. a thermostat with an expansion element), wherein the supply of the secondary cylinders with coolant can be adjusted during deactivation by another flow control valve.

The supply of the deactivated secondary cylinders with coolant can be adjusted, especially shut off, by the further flow control valve in adapting to operating conditions of the engine and the exhaust treatment device.

A working stroke can take place in one of the two primary cylinders for each revolution of the crankshaft and the working strokes for the secondary cylinders can be out of phase with the working strokes of the primary cylinders. The working stroke may be referred to as a power stroke.

The deactivation of the secondary cylinder can include shutting off a fuel feed to the secondary cylinder. Additionally, the secondary cylinders can contain at least one inlet valve and at least one exhaust valve and the deactivation of the secondary cylinders can include holding all inlet valves and all exhaust valves in their respective closed positions.

Furthermore, the secondary cylinders can be deactivated based on a comparison of an engine torque demand with an engine torque demand limit. Additionally, the secondary cylinders can be deactivated based on a comparison of a rate of change of the engine torque demand with a rate of change limit of the engine torque demand.

In another example, an engine system is provided that comprises the following: a four-cylinder engine constructed as previously described, an input that determines a demanded engine torque, and an electronic controller, which can be operated to receive the determined, demanded engine torque, wherein the electronic controller can be operated to determine, based on at least the determined, demanded engine torque, whether the engine should be operated using all four-cylinders, or to deactivate the secondary cylinders so that the engine is operated using only the two primary cylinders.

The input of the determined demanded engine torque can be produced by a speed control system. The engine system can also comprise the following: a gas pedal that can be operated by an operator of the engine and a gas pedal position sensor for monitoring the position of the gas pedal and supplying the input representing the demanded engine torque, and the electronic controller can be operated to receive the input from the gas pedal position sensor and to determine whether the engine should be operated using all four-cylinders or the secondary cylinders should be deactivated in order to operate the engine using only the two primary cylinders, based at least on the input received from the gas pedal position sensor.

If the demanded engine torque lies above a first predefined torque demand threshold the engine can be operated using all four-cylinders, and if the demanded torque lies below the first predefined torque demand threshold the engine can be operated as a two-cylinder engine, wherein the secondary cylinders are deactivated.

The engine system may also include the following: a temperature indicator (e.g., temperature sensor) for supplying an input to the electronic controller that indicates a temperature relating to the engine, and the electronic controller can be operated to deactivate the secondary cylinders if the temperature relating to the engine lies below a predefined temperature threshold.

The engine system may also include an exhaust gas treatment device, the temperature relating to the engine can be the exhaust gas temperature, the temperature indicator is then an exhaust gas temperature sensor for supplying an input to the electronic controller that indicates the temperature of the exhaust gas entering the exhaust treatment device, and the predefined temperature threshold is then a necessary working temperature of the exhaust treatment device. The expression "temperature indicator" in this case means the determination of a temperature either by direct temperature measurement using a sensor or by using a deduced temperature.

The temperature relating to the engine can alternatively be the temperature of a coolant circulating through the engine, the temperature sensor can be a coolant temperature sensor for supplying an input to the electronic controller that indicates the coolant temperature, and the predefined temperature threshold may be a desired working temperature of the coolant.

The temperature relating to the engine can be the temperature of coolant flowing through the primary cylinders. The temperature indicator is then a temperature sensor for supplying an input to the electronic controller that indicates the coolant temperature of the coolant flowing through the primary cylinders and the predefined temperature threshold may be a desired working temperature of the coolant flowing through the primary cylinders.

The temperature relating to the engine can be the temperature of coolant flowing through the secondary cylinders. The temperature indicator may be then a temperature sensor for supplying an input to the electronic controller that indicates the coolant temperature of the coolant flowing through the secondary cylinders and the predefined temperature threshold can be a desired working temperature of the coolant flowing through the secondary cylinders.

The temperature relating to the engine can alternatively be the temperature of oil circulating through the engine, the temperature indicator may be an oil temperature sensor for supplying an input to the electronic controller that indicates the oil temperature, and the predefined temperature threshold is a desired working temperature of the oil.

In another example, a method for operating an engine constructed as previously described is provided, wherein the method comprises the following: determining whether the secondary cylinders can be deactivated, and if the secondary cylinders can be deactivated, terminating a fuel feed to the secondary cylinders in order to deactivate them.

The secondary cylinders of the engine can be deactivated if the torque output demanded of the engine can be fulfilled by operating the engine on only two cylinders. The engine can be operated using four-cylinders if an engine torque demand exceeds a predefined threshold.

The secondary cylinders can contain at least one inlet valve and at least one exhaust valve and the method can also include deactivation of the secondary cylinders by holding all inlet valves and all exhaust valves in their respective closed positions.

With particular reference to FIGS. 1-3, a motor vehicle 50 with an engine system 1 is shown, which comprises a four-stroke, four-cylinder, reciprocating piston internal combustion engine 5, an exhaust gas treatment device 20 for the engine 5, an electronic controller 30, an operator demand input device in the form of a gas pedal 16 and an associated gas pedal position sensor 32.

The electronic controller 30 can comprise a plurality of electronic controllers, control units or electronic processors that are connected together and is shown as a single unit for illustration purposes. However, it will be appreciated that the electronic controller may include a plurality of units.

The engine system 1 also contains an exhaust gas temperature sensor 33 for supplying an output that indicates the temperature of the exhaust gas entering the exhaust treatment device 20, an electronically controlled fuel injection unit 10, an electronically controlled variable valve operating mechanism 15 and an engine revolution rate sensor 31 that is associated with a sprocket on a flywheel 9 of the engine 5. Other devices for measuring the engine revolution rate can be used if desired. Therefore, the engine is not limited to the use of a sprocket and of an engine revolution rate sensor.

The engine system 1 can also contain a speed control system in order to supply the electronic controller 30 with an input of an engine torque demand desired in order to maintain a set vehicle speed. The logic for the speed control system can be designed as part of the electronic controller 30 or can be a separate unit. Thus in one example, the speed control system may be at least partially integrated into the electronic controller.

The engine 5 comprises four-cylinders 11, 12, 13, and 14 disposed in series. Specifically, the cylinders are arranged in an inline configuration where a plane extends through a central axis of each cylinder and therefore the cylinders are arranged in a single cylinder bank. However, other cylinder configurations have been contemplated. As illustrated, there are two primary cylinders 11, 12 and two secondary cylinders 13, 14. In one example, the primary and secondary cylinders have about the same (e.g., substantially identical) displacement. Alternatively, the primary and secondary cylinders may have different displacements. In particular, the displacement of the primary cylinders can be greater than the displacement of the secondary cylinders. Additionally as illustrated, the two primary cylinders are adjacent to one another and the two secondary cylinders are adjacent to one another. It will be appreciated that the two primary cylinders include a first primary cylinder 11 and a second primary cylinder 12. Likewise, the two secondary cylinders include a first secondary cylinder 13 a second secondary cylinder 14. The cylinders 11, 12, 13, and 14 are arranged sequentially along the engine in a longitudinal direction. A longitudinal axis is provided in FIG. 3 for reference.

The primary cylinders 11, 12 may always be operating while the engine 5 is operating, and the secondary cylinders 13, 14 can be selectively deactivated, as described in detail in the following. Alternatively, in connection with an altered ignition control the cylinders 13, 14 can be operated as primary cylinders and the cylinders 11, 12 can be operated as secondary cylinders. With said alternative arrangement (other than as shown in the schematic illustration in FIG. 1), the continuously operating primary cylinders 13, 14 may be disposed close to the flywheel. This may be desirable for mass balancing, especially if the displacement of the primary cylinders is greater than the displacement of the secondary cylinders. In connection with an arrangement of the exhaust gas treatment device 20 close to the flywheel side of the engine, a particularly short distance between the primary cylinders and the exhaust gas treatment device 20 results therefrom. In addition, with said implementation there is a reduced flow resistance of the exhaust gas routing to atmosphere (arrow "E").

A coolant pump 2 provides coolant circulation in the cylinders 11, 12, 13, 14 and in the cylinder head (not shown) by a coolant distribution line 3. The coolant distribution line 3 can run in the cylinder block and/or cylinder head. The entry of coolant into the coolant distribution line 3 is enabled by a flow control valve 4a in a regulated manner. Another controllable flow control valve 4b is disposed in the coolant distribution line 3 for cooling the secondary cylinders 13, 14. One of the valves can be implemented as a thermostat with an expansion element. The valves can vary the flow of coolant through the cylinders by the electronic controller 30 using commands sent to the electronically controlled variable valve operating mechanism. If the secondary cylinders 13, 14 are deactivated, their cooling is reduced or e.g. occasionally alternately interrupted by the flow control valve 4b. Cooling of the deactivated cylinders is thereby prevented (e.g., inhibited), or the temperature of the secondary cylinders is held in a temperature range that is desirable for continuous lubrication. The fuel consumption is also reduced when the secondary cylinders are deactivated. The temperature of the secondary cylinders may be determined by a temperature sensor 4c or other suitable temperature indicator during the deactivation. The expression "temperature indicator" may mean in this case the determination of a temperature either by direct temperature measurement using a sensor (4c) or by using a deduced temperature (e.g., from a characteristic field of the load demand and the engine revolution rate). In the exemplary embodiment the coolant distribution line 3 is substantially integrated within the engine. Alternatively, the coolant distribution line 3 can be partially disposed outside the engine.

An exhaust manifold assembly 6 guides the exhaust gas leaving the engine 5 to an exhaust duct 7 and to the exhaust treatment device 20, and an end pipe 8 conducts exhaust gas from the exhaust treatment device 20 to atmosphere, as indicated by the arrow "E". The exhaust manifold assembly 6 (e.g., exhaust pipes) may include of two mutually separate segments (partial exhaust pipes) 6a, 6b.

Exhaust gas from the primary cylinders 11, 12 collected in segment 6a thereby flows to the exhaust duct 7. Exhaust gas from the secondary cylinders 13, 14 collected in segment 6b flows to the exhaust duct 7. The exhaust pipes of the cylinders are thereby combined in stages, in the depicted example.

The exhaust treatment device 20 can be of any known type that is suitable for reducing the emissions of the engine 5, and more than one type of exhaust gas treatment device can be connected in series to the exhaust duct 7. For example, and without limitation, a catalytic converter, a soot trap and a NOx trap or NOx catalytic converter can be disposed in series. In addition, one or more devices for reducing exhaust noise in the end pipe 8 can be installed after the exhaust treatment device(s), such as a muffler.

The exhaust gas temperature sensor 33 can be directly attached to an inlet end of the exhaust treatment device 20 or can be disposed before the exhaust treatment device 20 in order to measure the temperature of the exhaust gas flowing through the exhaust duct 7 at a position close to the inlet to the exhaust treatment device 20. It will be understood that the temperature may be deduced from other operating parameters, instead of being directly measured using a temperature sensor, if desired.

The position of the gas pedal 16 may be detected by the gas pedal position sensor 32, and the output of the sensor 32 may be provided as an input to the electronic controller 30, where it is processed to provide an indication of the operator's engine torque demand. The output of the engine revolution rate sensor 31 may be used by the electronic controller 30 as an indication of the current engine revolution rate.

Figure 1A:
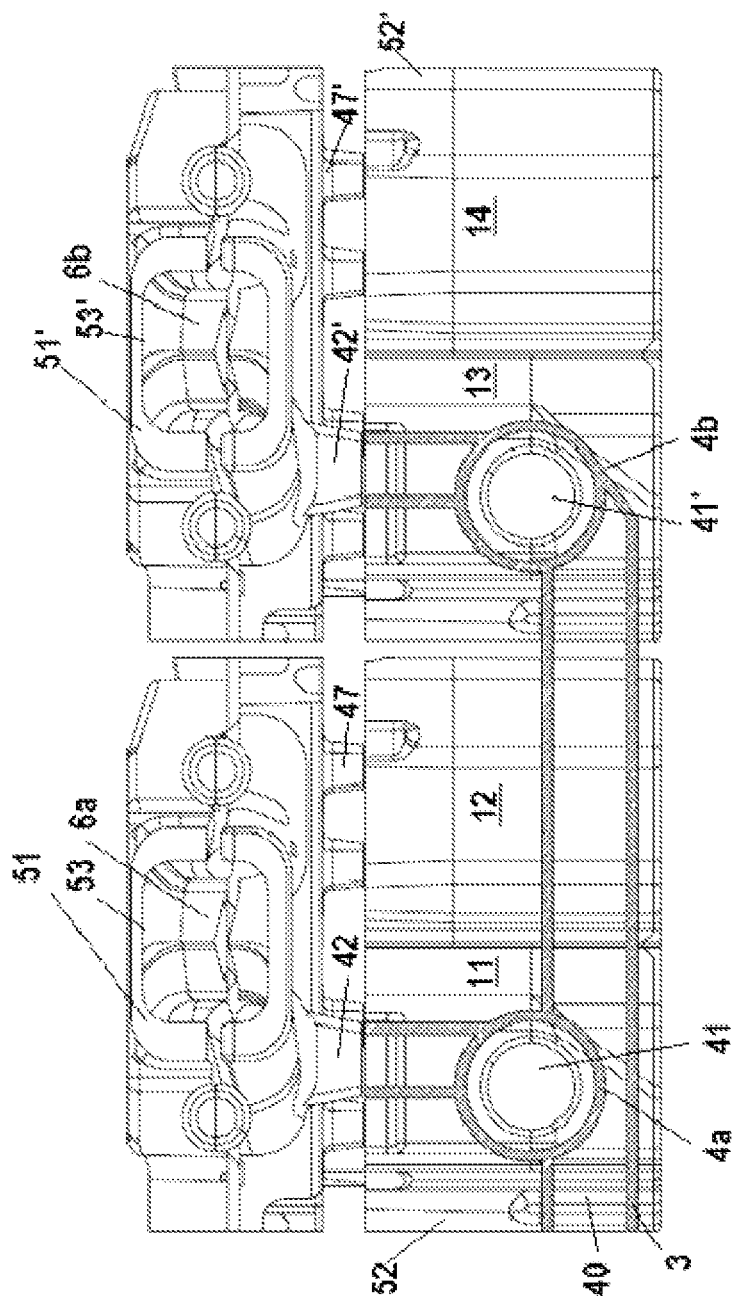
FIG. 1a shows a schematic view of a cylinder head cooling jacket and an engine block cooling jacket.

As shown in FIG. 1a, the delivery of coolant to the engine 5 from the water pump 2 (not shown) may takes place by the feed 40 of the coolant distribution line 3 in the engine block cooling jacket 52 to the primary cylinders 11, 12. The feed 40 is connected by a duct 41 in the flow control valve 4a to a duct 42 that leads into the cylinder head cooling jacket 51. One duct 42 is referred to in the present description. However, it will be appreciated that the feed of coolant can take place through a plurality of ducts. The flow control valve 4a regulates the flow of coolant from the water pump 2 into the cylinder head cooling jacket 51 and via ducts 47 to the engine block cooling jacket. It will be appreciated that regulation of coolant flow includes an adjustment of coolant flow to increase or decrease coolant flow.

Alternatively, the flow control valve 4a can wholly or partially regulate the flow of coolant from the water pump 2 via the coolant distribution line 3 to the engine block cooling jacket 52 and via ducts 47 to the cylinder head cooling jacket 51. The cylinder head cooling jacket 51 encloses the segment 6a. Exhaust gas from the primary cylinders 11, 12 collected in the segment 6a thereby flows through the exhaust opening 53 to the exhaust duct 7.

Furthermore, the feed of coolant to the engine 5 from the water pump 2 may take place by, for example, the feed 40 of the coolant distribution line 3 in the engine block cooling jacket 52' of the secondary cylinders 13, 14. The feed 40 is connected a duct 41' in the flow control valve 4b to a duct 42' that leads into the cylinder head cooling jacket 51'. In FIG. 1a only one duct 42' is shown. However, it will be appreciated that the feed of coolant can take place via a plurality of ducts. The flow control valve 4b regulates the flow of coolant from the water pump 2 to the cylinder head cooling jacket 51' and via ducts 47' to the engine block cooling jacket.

Alternatively, the flow control valve 4b may wholly or partially regulate the flow 40 of coolant from the water pump 2 via the coolant distribution line 3 to the engine block cooling jacket 52' and via ducts 47' to the cylinder head cooling jacket 51'. The cylinder head cooling jacket 51' encloses the exhaust manifold segment 6b.

Exhaust gas from the secondary cylinders 13, 14 collected in segment 6b flows through the exhaust opening 53' to the exhaust duct 7. The exhaust openings may be disposed approximately horizontally adjacent to each other in the installed position. This enables a compact construction of the engine.

In FIG. 1a the flow control valves 4a, 4b are shown integrated within the engine block cooling jacket 51, 51'. Alternatively, the flow control valves 4a, 4b can be disposed in housings on the engine block or in a common housing on the engine block forming the engine block cooling jacket 52, 52' or on the cylinder head. The coolant distribution line 3 can thereby also be disposed outside of the engine in order to connect the coolant pump 2 to the flow control valves. In one example, the flow control valve 4a is a thermostat with an expansion element.

Now especially referring to FIG. 2, the first primary cylinder 11 supports a piston 11p so that it can slide, the piston being connected by a connecting rod 11c to a first crank 11T of a four-crank flat plane crankshaft 40. In this way, a sliding piston is positioned in the first primary cylinder. The connecting rod 11c is rotatably connected by a small end bearing 11e and a gudgeon pin 11g to the piston 11p and is rotatably connected by a large end bearing 11D to the first crank 11T of the crankshaft 40. The large end bearing may be more generally referred to as an end bearing.

The second primary cylinder 12 supports a piston 12p so that it can slide, the piston being connected by a connecting rod 12c to a third crank 12T of the triple-crank flat plane crankshaft 40. The connecting rod 12c is rotatably connected to the piston 12p by an end bearing 13e and a gudgeon pin 12g and is rotatably connected to the first crank (crank pin) 12T of the crankshaft 40 by a large end bearing 12D.

The first secondary cylinder 13 supports a piston 13p so that it can slide, the piston being connected to a second crank 13T of the four-crank flat plane crankshaft 40 by a connecting rod 13c. The connecting rod 13c is rotatably connected to the piston 13p by an end bearing 13E and a gudgeon pin 13g and is rotatably connected to the first crank (crank pin) 13T of the crankshaft 40 by a large end bearing 13D.

The second secondary cylinder 14 supports a piston 14p so that it can slide therein, the piston being connected to a second crank 14T of the four-crank flat plane crankshaft 40 by a connecting rod 14c. The connecting rod 14c is rotatably connected to the piston 14p by an end bearing 14E and a gudgeon pin 14g and is rotatably connected to the first crank (crank pin) 14T of the crankshaft 40 by a large end bearing 14D.

The secondary cylinders 13, 14 are disposed adjacently in series with the primary cylinders 11, 12. The secondary cylinders 13, 14 can have the same capacity as the two primary cylinders 11, 12 or a different capacity, either because of a different bore diameter or a different stroke or a combination thereof, but in the example described all four-cylinders 11, 12, 13 and 14 have the same capacity and the bore and the stroke are the same for all four-cylinders 11, 12, 13 and 14.

Each of the cylinders 11, 12, 13 and 14 comprises a respective inlet and exhaust valve 11a, 11b; 12a, 12b; 13a, 13b, 14a, 14b, but it is understood that in practice there can be a different number of inlet valves and exhaust valves, e.g. two inlet valves and two exhaust valves or three inlet valves and two exhaust valves. It is also possible that the secondary cylinders 13, 14 comprise a different number of inlet valves and exhaust valves than the primary cylinders 11, 12, in some examples.

In the illustrated exemplary embodiment the inlet valves and the exhaust valves are operated by the electronically controlled variable valve operating mechanism 15, so that the opening and closing of the valves 11a, 11b; 12a, 12b; 13a, 13b, 14a, 14b can be controlled and can especially be controlled so as to deactivate the inlet valves and exhaust valves 13a, 13b, 14a, 14b of the secondary cylinders 13, 14 so that they remain closed if the secondary cylinders 13, 14 are deactivated. However, other valve deactivation mechanisms have been contemplated. For instance, the valve deactivation mechanisms may be mechanical.

Figure 1B:
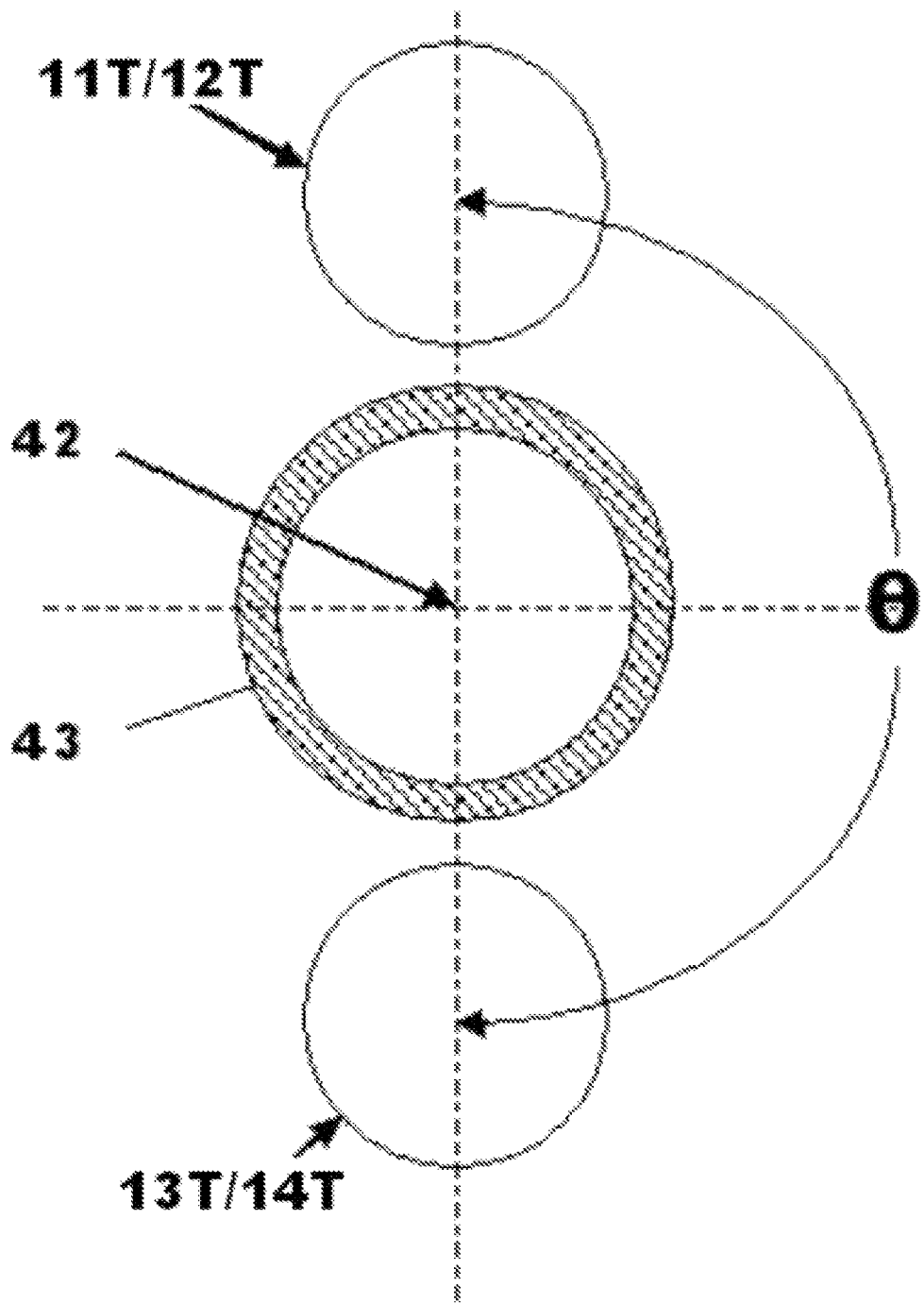
FIG. 1b shows a schematic view of the crankshaft crank.

The crankshaft 40 can be rotated around a central axis 42 and is supported in this case by five main bearings 43. As can be seen best in FIG. 2, the cranks 11T, 12T for the two primary cylinders 11, 12 are disposed in phase with each other, and the cranks 13T, 14T for the secondary cylinders 13, 14 are disposed or oriented so that they are out of phase by an angle θ relative to the cranks 11T, 12T for the two primary cylinders 11, 12. In one example, the angle θ (see FIG. 1b) may be an angle of 180°, so that it can be said that the cranks 11T and 12T for the primary cylinders 11, 12 are out of phase by 180° relative to the cranks 13T and 14T for the secondary cylinders 13, 14. The effect of this is that whenever the pistons 11P, 12P of the primary cylinders 11, 12 are at top dead center, the pistons 13P, 14P of the secondary cylinders 13, 14 are at bottom dead center, and vice versa. The angle of 180° may be desirably in terms of mass balancing, but it can readily lie between 175° and 185°, for example. Therefore it will be appreciated that the secondary cylinders may be positioned 175°-185° out of phase relative to the two primary cylinders with regard to crank angle. However, other relative positions between the secondary and primary cylinders have been contemplated.

The engine 5 can be a four-stroke diesel engine or an Otto engine. The mechanism for deactivation of the secondary cylinders 13, 14 may be shutting off or terminating the fuel feed to the secondary cylinders 13, 14. Moreover, when deactivating the cylinders it may be desirable to deactivate both the inlet valves and the exhaust valves 13a, 13b, 14a, 14b by the electronic controller 30 via commands sent to the electronically controlled variable valve operating mechanism 14.

The closing of the inlet valves and exhaust valves 13a, 13b, 14a, 14b has the advantage that pump losses are reduced while the secondary cylinders 13, 14 are deactivated. It is understood, however, that possibly with other embodiments no means are provided for deactivation of the inlet valves and exhaust valves 13a, 13b and/or 14a, 14b, so that they operate normally during the deactivation. Other valve operating arrangements are provided, so that during the deactivation of the secondary cylinders 13, 14 only the inlet valves are held closed or only the exhaust valves are held closed, for example.

Both the ignition and the fuel feed to the secondary cylinders 13, 14 are inhibited during the deactivation or the ignition could be held in a normal operating state, wherein only the fuel feed is interrupted.

As FIG. 3 shows, the exhaust manifold 6 may include two mutually separate segments 6a, 6b. Exhaust gas from the primary cylinders 11, 12 collected in the segment 6a flows to the exhaust duct 7 in this case. Exhaust gas from the secondary cylinders 13, 14 collected in the segment 6b flows to the exhaust duct 7. A turbocharger can be disposed between each of the segments 6a, 6b and the exhaust duct 7, in one example.

As FIG. 3 also shows, the four-cylinders 11, 12, 13, 14 form two groups, each with two cylinders 11, 12 and 13, 14, respectively. The exhaust manifold segment 6a or 6b are combined to form an exhaust duct (overall exhaust pipe) 7. A turbine 17a of an exhaust gas turbocharger 17, which drives an associated compressor 17b disposed in the induction system, is disposed between the exhaust duct 7 and the exhaust manifold segment 6a and 6b in each case. With the embodiment illustrated in FIG. 1, the two exhaust manifolds 7 are integrated within the cylinder head 10 (i.e., the exhaust pipes 5 of each group are combined within the cylinder head 10 to form an overall exhaust pipe 8). The compressors of the two turbochargers may be each connected to a plenum 18a or 18b of the inlet valves. One of the compressors with the plenum 18a is connected to inlet valves 11a, 12a of the primary cylinders. The second compressor with the plenum 18b of the secondary cylinder is connected to the inlet valves 13a, 14a. In FIG. 3 only one inlet valve is shown schematically in each case. However in other examples, a plurality of inlet valves per cylinder can be disposed. This may also apply to the exhaust valves. An air flow sensor is disposed at each plenum 18a and 18b (not shown in the schematic illustration). Instead of two separate components for plenum 18a and 18b, one plenum can be arranged with a dividing wall for the air supply of the primary cylinders separately from the air supply of the secondary cylinders. The dividing wall can be formed by a regulated relief device (e.g., a flap). This enables the resonance characteristic of the plenum and the air flow feed to the inlet valves to be improved.

The operation of the engine system 1 may be as follows: if a high torque output from the engine 5 is desired, the electronic controller 30 can be programmed to operate the engine 5 in a four-cylinder operating mode, wherein all four-cylinders 11, 12, 13 and 14 are working. The determination of what represents a high torque output is in this case the input of the engine torque demanded by an operator of the engine 5 based on the input received by the electronic controller 30 from the gas pedal position sensor 32. An engine torque demand could be from a speed control system.

In one example, the output of the gas pedal position sensor 32 varies between 0.0 V and 4.2 V, and after signal conditioning the 0.0 V output corresponds to a gas pedal position of 0%, which indicates that the operator is not pressing the gas pedal 16, and the 4.2 V output corresponds to a gas pedal position of 100%, which indicates that the gas pedal 16 has been fully depressed by the operator. The gas pedal positions can have a direct relationship to the demanded engine torque or there can be a nonlinear relationship between the gas pedal position and the demanded engine torque.

If with such an arrangement the output from the gas pedal position sensor 32 indicates that the operator has depressed the gas pedal 16 by more than a predefined extent that corresponds to a predefined engine torque demand threshold, then operation with all four-cylinders 11, 12, 13 and 14 is selected. If the gas pedal 16 is depressed by less than said predefined extent, then operation only with the two primary cylinders 11, 12 is selected and the secondary cylinders 13, 14 are deactivated, in one example. In the case of a deactivation this causes the electronic controller 30 to act so as to cut off the fuel feed to the secondary cylinders 13, 14 and to control the valve operating unit 14 such that the inlet valves and the exhaust valves 13a, 13b, 14a, 14b are deactivated, in one example.

The exact value selected for said predefined engine torque demand limit depends on the exact configuration of the engine 5 and is selected such that if, as in this case, the engine 5 is installed in the motor vehicle 5, the acceleration performance of the motor vehicle 50 may not be strongly affected by operating with two cylinders 11, 12. Additionally, the secondary cylinders may be deactivated when operation of the cylinders at high efficiency is not needed. For instance, the operation of the engine may be controlled so that the overall efficiency achieved by operating with two cylinders exceeds the efficiency achievable if the engine 5 were to be operated with four-cylinders. By selective deactivation of the secondary cylinders 13, 14 it is therefore possible to operate the engine 5 closer to its maximum efficiency, whereby the fuel consumption is reduced.

The deactivation has previously been described as working based on the demanded engine torque, which in this case is deduced from the gas pedal position. However, the deactivation may be triggered by other engine conditions. For example, the rate of change of the demanded engine torque, as indicated by the gas pedal position, could be used in combination with a predefined torque demand threshold, in one example. If in such a case the rate at which the gas pedal is depressed lies above a predefined threshold, then the engine itself could be operated with all four-cylinders 11, 12, 13 and 14 if the actual engine torque demand lies below the engine torque demand threshold.

This could be achieved using logic, for example, and without limitation:
If dTd>dTdümit OR Td>Tdnmit then use four-cylinders;
Otherwise use two cylinders
wherein:
dTd is the current rate of change of the gas pedal position;
dTdümit is the limit for the rate of change of the gas pedal position;
Td is the current torque demand based on the gas pedal position; and
Tdnmit is the predefined torque demand limit.

The rate of change of the engine torque demand can alternatively be deduced from a rate of change of the engine torque demand by a speed control system. One advantage with the use of such a combination is that a sudden change in the gas pedal position indicates that the engine operator, such as a driver of the motor vehicle 50, is demanding that the torque generation is rapidly increased, and therefore it is desirable that this is expressed in all four-cylinders 11, 12, 13 and 14 being used to work, even if the currently demanded level of engine torque lies below the predefined torque demand limit (Tdnmit). For example, possibly during an overtaking maneuver the gas pedal 16 is rapidly depressed from e.g. 15% to 90%, but without the use of the rate of change logic the secondary cylinders 13, 14 would remain deactivated until the gas pedal 16 physically passes the predefined engine torque demand limit. By using rate of change logic, however, the secondary cylinders 13, 14 can again be brought into use once a rate of change of the gas pedal position exceeds the gas pedal rate of change limit (dTdümit), whereby the engine response time is reduced and the necessity for four-cylinder operation is anticipated.

Although a reference is made to the gas pedal position above such that it is a percentage demand, it is understood that this does not have to be the case and the operator's torque demand could be derived based on the variations in the output voltage of the gas pedal position sensor 32 or variations in the output value if a digital position sensor is used.

It is understood that the transition between the deactivated and active state may not occur immediately when the conditions for the occurrence of such a transition are produced. For example and without limitation, the secondary cylinders 13, 14 can be reactivated if one enters its induction stroke, and may only be deactivated at the end of an exhaust stroke.

Figure 4:
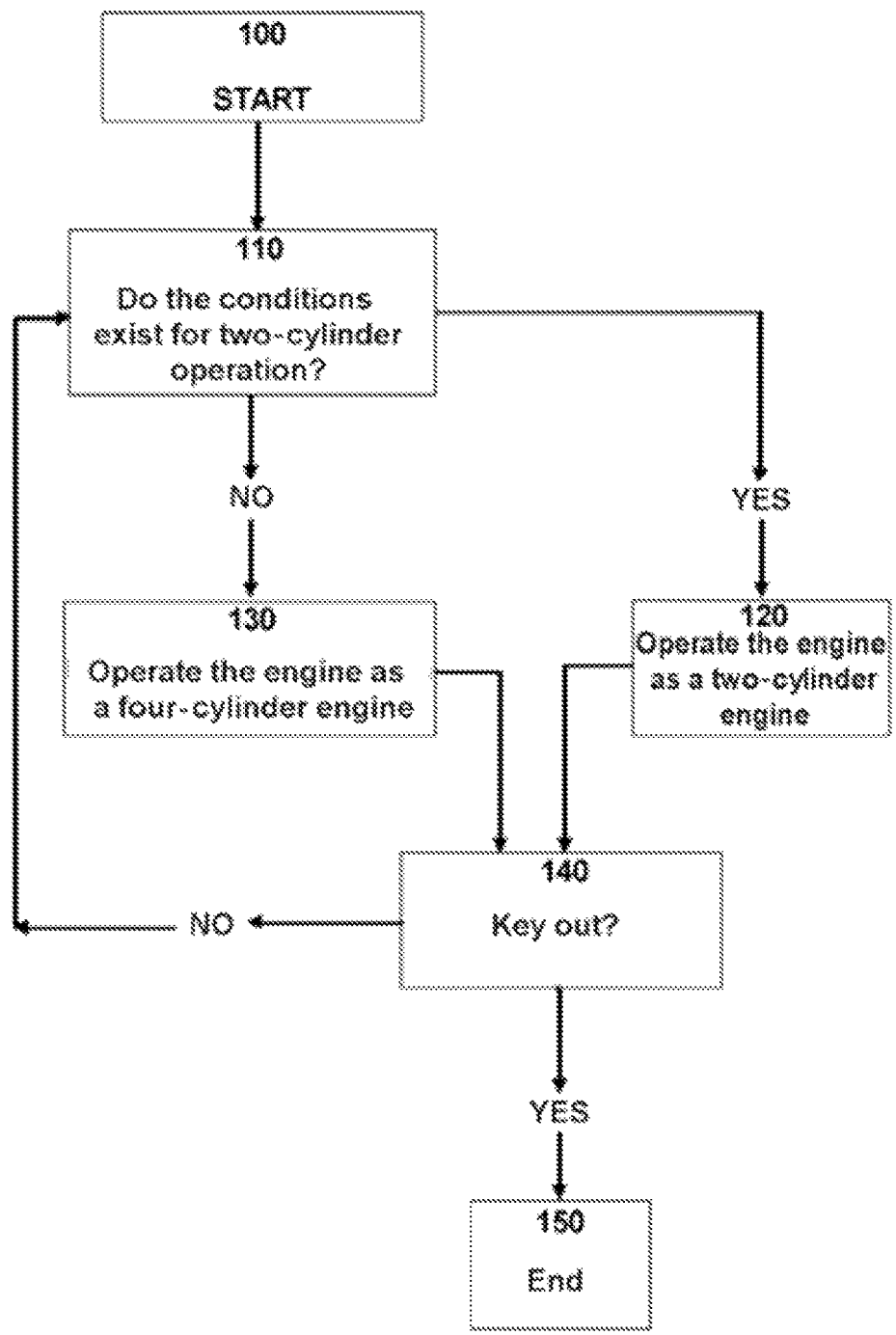
FIG. 4 shows a flowchart of a first exemplary embodiment of a method for operating an engine.

Referring now to FIG. 4, a first embodiment of a method for operating a four-cylinder engine 5 of the type and construction described above is illustrated. However, it will be appreciated that the method may be implemented by another suitable engine in other examples.

The method starts in box 100, which in the case of a motor vehicle would be a key-in event. The method then proceeds to box 110, where a check is made as to whether the conditions for operating the engine 5 as a two-cylinder engine exist. Said test could be, in its simplest form:
Is Td<Tdümit?
Wherein:
Td is the current torque demand, in this case based on the gas pedal position and
Tdnmit is the predefined engine torque demand limit.

Alternatively, the engine torque demand may come from a speed control system. If the current engine torque demand is below the predefined engine torque demand limit, the method proceeds to box 120, where the engine 5 is operated as a two-cylinder engine, wherein the secondary cylinders 113, 14 in this case are deactivated by the electronic controller 30 cutting off the diesel fuel feed to the secondary cylinders 13, 14 and deactivating the inlet valves and exhaust valves 13a, 13b, 14a, 14b for the secondary cylinders 13, 14 using the electronically controlled variable valve operating mechanism 15. The method then continues from box 120 to box 140, where it is determined whether a key-out event has occurred, and if it has occurred, the method ends in box 150, but if no key-out event has occurred, the method returns to box 110. The method continues through boxes 110, 120 and 140 while the conditions for a two-cylinder operation continue and no key-out event has occurred.

Referring again to box 110, if the current engine torque demand lies above the predefined engine torque demand limit, the method continues to box 130, where the engine 5 is operated as a four-cylinder engine 5, wherein all four-cylinders 11, 12, 13 and 14 are working. The method then continues from box 130 to box 140, where it is determined whether a key-out event has occurred, and if it has occurred the method ends in box 150, but if no key-out event has occurred, the method returns to box 110. The method continues through boxes 110, 130 and 140 while conditions for four-cylinder operation continue and no key-out event has occurred.

As an alternative to the above simple test described in relation to box 110, the test could alternatively take the following form:

If dTd>dTdümit OR Td>Tdümit then use four cylinders;
Otherwise use two cylinders
whereby:
  dTd is in this case the current rate of change of the gas pedal position;
  dTdümit is the limit for the rate of change of the gas pedal position;
  Td is in this case the current torque demand based on the gas pedal position and
  Tdümit is the predefined torque demand limit.

Alternatively, a rate of change of a torque demand can be from a speed control system. If such a test is used, then the result of box 110 would be to continue to box 120 if the current rate of change of the gas pedal position lies below the limit for the rate of change of the gas pedal position and the current torque demand based on the gas pedal position lies below the predefined torque demand limit, but to continue to box 130 if either the current rate of change of the gas pedal position lies above the limit for the rate of change of the gas pedal position or the current engine torque demand based on the gas pedal position lies above the predefined engine torque demand limit. The method is otherwise unaffected by said change to the test in box 110.

It will be understood that the predefined engine torque demand limit can be varied based on other operating conditions of the engine 5 and is thus not necessarily a fixed value. For example, and without limitation, the value of the predefined torque demand limit could be varied with the engine revolution rate, so that the limit increases with the engine revolution rate.

Figure 5A:
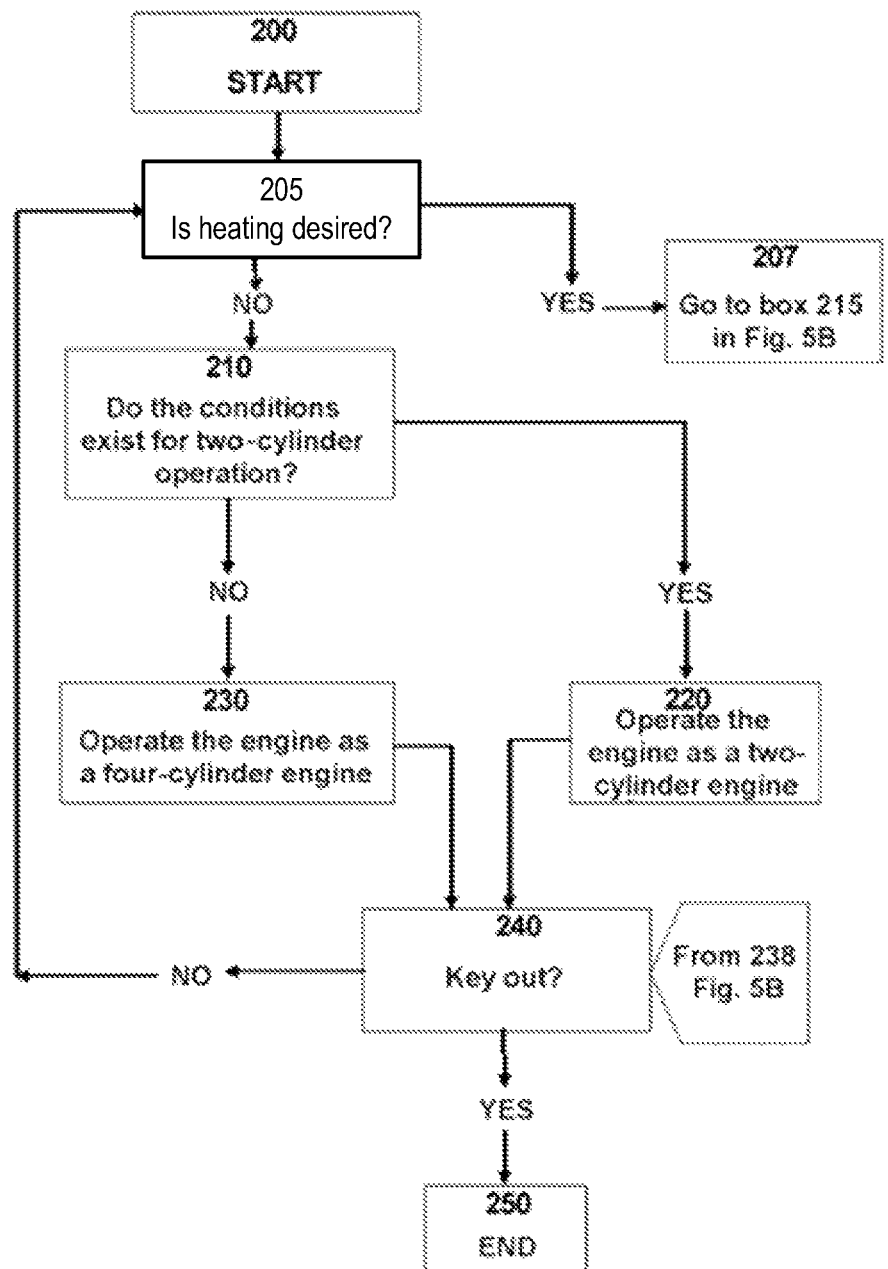
FIGS. 5A and 5B show flowcharts that show a second exemplary embodiment of a method for operating an engine.
Figure 5B:
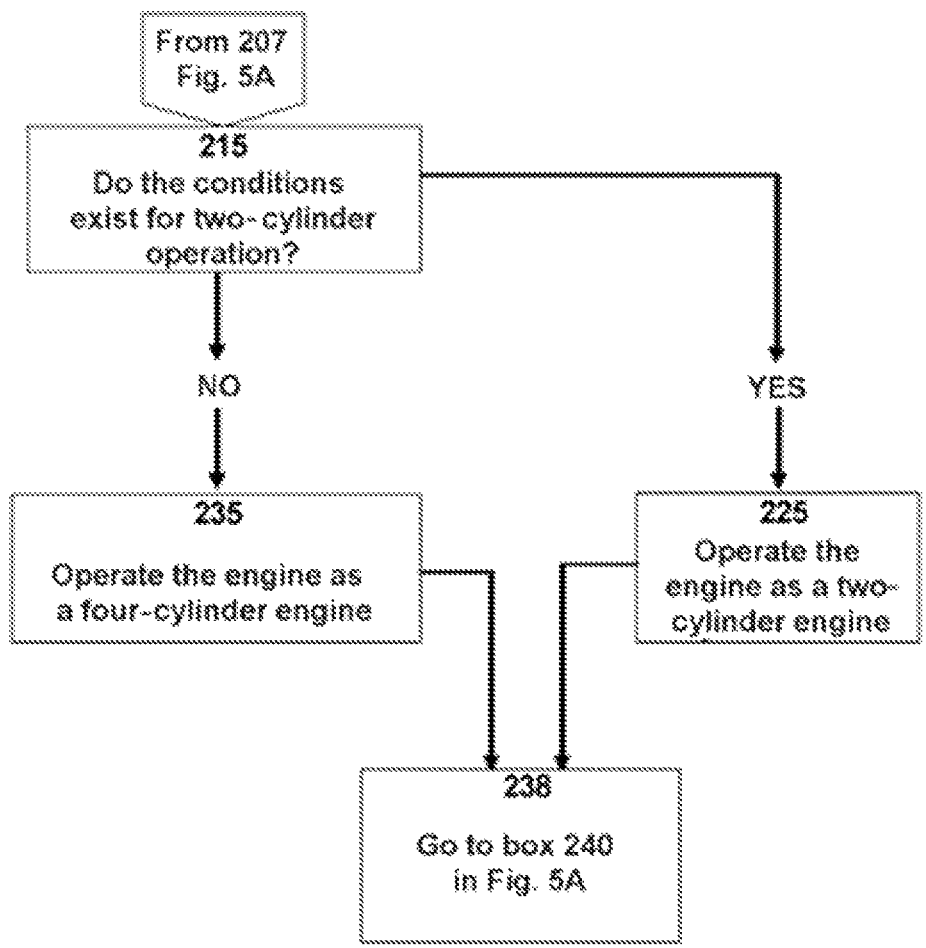

Referring now to FIGS. 5A and 5B, a second embodiment of a method is shown. The method starts in box 200, which in the case of a motor vehicle would be a key-in event. The method then continues to box 205, where it is determined whether heating (e.g., engine heating) is desired. Said test can e.g., consist of whether the temperature of the exhaust gases has to be increased in order to accelerate the starting of one or more exhaust gas treatment devices, or whether the temperature of the lubricating oil flowing through the engine 5 has to be increased in order to reduce its viscosity, whereby frictional losses are reduced, or whether the temperature of a coolant flowing through the engine 5 in order to cool it must be increased, e.g., following a cold start, or a combination thereof. In one example, with deactivation of the secondary cylinders 13, 14 their cooling may be reduced by reducing the coolant flow by a control signal of the electronic controller 30 to the electronically controlled variable valve operating mechanism 4b.

In each case the test is in the form of a comparison using the electronic controller 30 of a current temperature, such as e.g., detected by the coolant temperature sensor 4b, with a predefined temperature threshold such as e.g. a minimum temperature for minimized frictional losses. If the coolant temperature of the coolant flowing through the secondary cylinder lies above the minimum temperature, then the test would not be passed and the method would continue to box 210, and if the test is passed, which indicates that the current coolant temperature lies below the predefined temperature threshold and heating is desired, the method continues to box 207.

Initially when dealing with the test not being passed in box 205 and the consequential continuation of the method to box 210, there is a check in box 210 as to whether the conditions exist for operating the engine 5 as a two-cylinder engine. Said test is the same test as used in box 110 in FIG. 4 and will not be described in detail again.

If the current engine torque demand lies below the predefined engine torque demand limit, the method continues to box 220, where the engine 5 is operated as a two-cylinder engine with deactivated secondary cylinders 13, 14. The method then continues from box 220 to box 240, where it is determined whether a key-out event has occurred, and if it has occurred the method ends in box 250, but if no key-out event has occurred the method returns to box 205. The method continues through boxes 205, 210, 220 and 240 while no heating is desired, the conditions for two-cylinder operation persist and no key-out event has occurred.

Referring again to box 210, if the current engine torque demand lies above the predefined engine torque demand limit, the method continues to box 230, where the engine 5 is operated as a four-cylinder engine 5, wherein all four-cylinders 11, 12, 13 and 14 are working. The method then continues from box 230 to box 240, where it is determined whether a key-out event has occurred. If a key-out event has occurred the method ends in box 250, but if no key-out event has occurred the method returns to box 205. The method continues through boxes 205, 210, 230 and 240 while no heating is desired, the conditions for four-cylinder operation persist and no key-out event has occurred.

As described above with reference to box 110 in FIG. 4, the test in box 210 could include a test for the rate of change of the engine torque demand as deduced using the rate of change of the gas pedal position.

Now referring again to box 205, if the test in box 205 is passed, which indicates that heating is desired, the method continues via box 207 to box 215. In box 215 a check is made as to whether the conditions for operating the engine 5 as a two-cylinder engine exist. Said test is similar to the test as used in box 210, but the value of the predefined engine torque limit could be different. This means that the fuel efficiency of the engine 5 can be temporarily adversely affected so as to reduce the time required to heat the cooling water.

In the case of a four-cylinder engine with cylinders of identical capacity, when running with two cylinders the coolant flow is reduced by about half for the same power output, but the temperature of the coolant is increased. Thus the heat dissipation can also be increased.

If the current engine torque demand lies below the second predefined engine torque demand, the method continues from box 215 to box 225, where the engine 5 is operated as a two-cylinder engine with deactivated secondary cylinders 13, 14. The method then continues from box 225 to box 238 and then to box 240, where it is determined whether a key-out event has occurred. If a key-out event has occurred the method ends in box 250, and if no key-out event has occurred the method returns to box 205. The method then continues through boxes 205, 207, 215, 225, 238 and 240 while heating is desired, the conditions for two-cylinder operation persist and no key-out event has occurred.

Referring again to box 215, if the current engine torque demand lies above the second predefined engine torque demand limit, the method continues to box 235, where the engine 5 is operated as a four-cylinder engine 5, wherein all four cylinders 11, 12, 13 and 14 are working. The method then continues from box 235 to box 238 and from box 238 to box 240, where it is determined whether a key-out event has occurred. If a key-out event has occurred the method ends in box 250, and if no key-out event has occurred the method returns to box 205. The method then continues through boxes 205, 207, 215, 235, 238 and 240 while heating is desired, the conditions for four-cylinder operation persist and no key-out event has occurred.

FIGS. 6A and 6B show two possible timing diagrams for the engine 5, wherein the main difference between said timing diagrams is that in FIG. 6A the timing control of the secondary cylinders 113, 14 differs from that in FIG. 6B by 360 degrees. The actions carried out in FIGS. 6A and 6B for the secondary cylinders 13, 14 are those that occur if the secondary cylinders 13, 14 are working and the engine 5 is using all four-cylinders 11, 12, 13 and 14 to generate power. 6A:

| Crankshaft angle degrees | Cylinder 11 | Cylinder 12 | Cylinder 13 | Cylinder 14 |
|---|---|---|---|---|
| 0 | TDC Induction | TDC Working | BDC Compression | BDC Exhaust |
| 180 | BDC Compression | BDC Exhaust | TDC Working | TDC Induction |
| 360 | TDC Working | TDC Induction | BDC Exhaust | BDC Compression |
| 540 | BDC Exhaust | BDC Compression | TDC Induction | TDC Working |
| 720 | TDC | TDC | BDC | BDC |

6B:

| Crankshaft angle degrees | Cylinder 11 | Cylinder 12 | Cylinder 13 | Cylinder 14 |
|---|---|---|---|---|
| 0 | TDC Induction | TDC Working | BDC Exhaust | BDC Compression |
| 180 | BDC Compression | BDC Exhaust | TDC Induction | TDC Working |
| 360 | TDC Working | TDC Induction | BDC Compression | BDC Exhaust |
| 540 | BDC Exhaust | BDC Compression | TDC Working | TDC Induction |
| 720 | TDC | TDC | BDC | BDC |

It is also noted that if the secondary cylinders 13, 14 are deactivated, the engine 5 is working as a conventional two-cylinder engine, wherein power is generated in alternative cycles by the two primary cylinders 11, 12. This means that each operating phase of the primary cylinder 11 is timed so that it occurs 360 degrees from the same operating phase in the other primary cylinder 12 and vice versa. Therefore whenever one of the pistons 11P, 12P in the primary cylinders 11, 12 moves from top dead center to bottom dead center, power is generated by the engine 5. Therefore a working stroke takes place in one of the two primary cylinders 11, 12 for each crankshaft revolution. Moreover in the depicted example, a working stroke of the secondary cylinders 13, 14 does not occur at the same time as a working stroke in one of the two primary cylinders 11, 12. For the secondary cylinders 13, 14, each operating phase of the secondary cylinder 13 is timed so that it occurs 360 degrees from the same operating phase in the other secondary cylinder 14 and vice versa. Therefore a working stroke takes place in one of the two primary cylinders 13, 14 for each crankshaft revolution.

Therefore, in summary the an engine, an engine system, and a method that enables a four-cylinder engine to be operated as a four-cylinder engine or selectively as a two-cylinder engine is provided. The use of a flat plane crankshaft enables the economical production of the engine, and the selective deactivation of one of the cylinders enables efficient operation of the engine, whereby the fuel consumption is reduced, and can also be used to provide rapid heating (e.g., of the exhaust gas), of the coolant flowing through the engine and of the lubricating oil flowing through the engine. Because operating the engine on two cylinders in comparison to four-cylinders moves the load point for the working cylinders and reduces the flow of gas proportionately, the production of emissions such as of soot, HC and CO can be reduced.

The electronic controller 30 can respond both to an operator's torque demand and also to a speed control system torque demand. The electronic controller 30 can be designed such that the secondary cylinders 13, 14 are deactivated if a treatment regeneration event occurs in order to support raising the temperature of the exhaust gas emanating from the engine 5.

Although the engine has been described in relation to a four-cylinder diesel engine, it is understood that it could be applied to a four-cylinder engine with external ignition. However, two stroke engines have also been contemplated. Additionally in one example, the fuel feed and the valve timing control for the deactivatable cylinders do not necessarily have to be the same as those for the primary working cylinders.

By using the described cylinder timing control a smoother flow of power is produced, since the power of the two secondary cylinders is generated out of phase to the two primary cylinders.

FIG. 7 shows a method 700 for operation of an internal combustion engine. The method 700 may be implemented via the engine described above with regard to FIGS. 1-6b. Alternatively, the method 700 may be implemented via another suitable engine.

At 702 the method includes operating two primary cylinders coupled to a crankshaft and two secondary cylinders coupled to the crankshaft to perform combustion. It will be appreciated that the two primary and secondary cylinders arranged in an inline configuration, the two primary cylinders adjacent to one another, the two secondary cylinders adjacent to one another, and the secondary cylinders positioned 175°-185° out of phase relative to the two primary cylinders with regard to crank angle.

At 704 the method includes flowing exhaust gas through a first exhaust manifold extending through a cylinder head and in fluidic communication with the primary cylinders. Next at 706 the method includes flowing exhaust gas through a second exhaust manifold extending through the cylinder head and in fluidic communication with the secondary cylinders, the first exhaust manifold separate from the second exhaust manifold.

At 708 the method includes selectively deactivating the two secondary cylinders to perform combustion in only the two primary cylinders. Next at 710 the method includes adjusting the flowrate of coolant through a first cylinder head cooling jacket adjacent to the secondary cylinders in response to the selective deactivation. It will be appreciated that in one example the flowrate of coolant through the first cylinder head cooling jacket is decreased in response to the selective deactivation. Additionally, it will be appreciated that the first cylinder head cooling jacket may be fluidly separated from a second cylinder head cooling jacket adjacent to the primary cylinders.

Steps 702-706 may be implemented during a first operating condition and steps 708-710 may be implemented during a second operating condition. The first operating condition may be when the torque demand in the engine is greater than a threshold value and the second operating condition may be when the torque demand in the engine is less than a threshold value. As previously, discussed the torque demand may come from an acceleration pedal, a cruise control system, etc. Still further in one example, the first operating condition may additionally or alternatively be when the engine temperature is above a threshold value and the second operating condition may be when the engine temperature is below a threshold value. Specifically in one example, the second operating condition is when a driver requested torque is less than a threshold value.

Further in another example, the two primary cylinders include a first primary cylinder and a second primary cylinder and the two secondary cylinders include a first secondary cylinder and a second secondary cylinder, the first primary cylinder, the second primary cylinder, the first secondary cylinder, and the second secondary cylinder are consecutively arranged in a longitudinal direction in the engine and where the successive firing order of the cylinders during the first operating condition is the second primary cylinder, the first secondary cylinder, the first primary cylinder, and the second secondary cylinder.

Still further in another example, the two primary cylinders include a first primary cylinder and a second primary cylinder and the two secondary cylinders include a first secondary cylinder and a second secondary cylinder, the first primary cylinder, the second primary cylinder, the first secondary cylinder, and the second secondary cylinder are consecutively arranged in a longitudinal direction in the engine and where the successive firing order of the cylinders during the first operating condition is the second primary cylinder, the second secondary cylinder, the first primary cylinder, and the first secondary cylinder.

The person skilled in the art understands that, although the invention has been described by way of example with reference to one or a plurality of embodiments, it is not limited to the disclosed embodiments and that alternative embodiments could be constructed without departing from the scope of protection of the invention as defined by the accompanying claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
    two adjacent primary cylinders;
    two secondary cylinders disposed adjacent to the primary cylinders and configured to be selectively deactivated, each of the primary and secondary cylinders having a sliding piston positioned therein, the piston being operatively connected to a crankshaft by a connection rod and a crank, the cranks for the two primary cylinders positioned in phase and the cranks for the secondary cylinders positioned between 175°-185° out of phase relative to the two primary cylinders; and
    an exhaust pipe of the engine including an exhaust manifold segment coupled to the primary cylinders and another exhaust manifold segment coupled to the secondary cylinder;
    where a working stroke occurs in one of the two primary cylinders per revolution of the crankshaft and the working stroke for one of the two secondary cylinders is out of phase with the working strokes of the primary cylinders; and
    where the secondary cylinders are configured to be deactivated to increase exhaust gas temperature.

2. The internal combustion engine of claim 1, wherein the separate exhaust manifold segments are enclosed by cylinder head cooling jackets.

3. The internal combustion engine of claim 1, wherein the primary cylinders and the secondary cylinders comprise fluidically separable engine block cooling jackets and a respective flow control valve arranged for coolant feed to an engine block cooling jacket.

4. The internal combustion engine of claim 3, wherein each of the engine block cooling jackets is connected to a cylinder head cooling jacket.

5. The internal combustion engine of claim 4, further comprising a coolant distribution line connecting a water pump to the cylinder head cooling jackets to the engine block cooling jackets.

6. The internal combustion engine of claim 5, wherein the coolant distribution line is included in the engine block cooling jacket.

7. The internal combustion engine of claim 4, where the flow control valves are disposed in a common housing on the engine block housing forming the engine block cooling jacket.

8. The internal combustion engine of claim 1, where the engine includes a total of 4 cylinders in an in-line configuration.

9. An engine system comprising:

two adjacent primary cylinders;

two secondary cylinders disposed adjacent to the primary cylinders and configured to be selectively deactivated, each of the primary and secondary cylinders having a sliding piston positioned therein, the piston being operatively connected to a crankshaft by a connection rod and a crank, the cranks for the two primary cylinders positioned in phase and the cranks for the secondary cylinders positioned 175°-185° out of phase relative to the two primary cylinders with regard to crank angle; and an exhaust pipe of the engine including an exhaust manifold segment coupled to the primary cylinders and another exhaust manifold segment coupled to the secondary cylinders; and an electronic controller configured to:
receive a torque request input from a torque device; and
selectively deactivate the secondary cylinders to operate the engine to perform combustion in only the two primary cylinders based on the torque request input.

10. The internal combustion engine of claim 9, where the cylinders are arranged in a single cylinder bank.

11. The internal combustion engine of claim 10, where the cylinders are arranged in an inline configuration.

12. A method for operating an internal combustion engine comprising:

during a first operating condition, operating two primary cylinders coupled to a crankshaft and two secondary cylinders coupled to the crankshaft to perform combustion, the two primary and secondary cylinders arranged in an inline configuration, the two primary cylinders adjacent to one another, the two secondary cylinders adjacent to one another, and the secondary cylinders positioned 175°-185° out of phase relative to the two primary cylinders with regard to crank angle; and during a second operating condition, selectively deactivating the two secondary cylinders to perform combustion in only the two primary cylinders.

13. The method of claim 12, further comprising during the second operating condition, adjusting the flowrate of coolant through a first cylinder head cooling jacket adjacent to the secondary cylinders in response to the selective deactivation, the first cylinder head cooling jacket fluidly separated from a second cylinder head cooling jacket adjacent to the primary cylinders.

14. The method of claim 13, where the flowrate of coolant through the first cylinder head cooling jacket is decreased in response to the selective deactivation.

15. The method of claim 12, further comprising during the first operating condition, flowing exhaust gas through a first exhaust manifold extending through a cylinder head and in fluidic communication with the primary cylinders and flowing exhaust gas through a second exhaust manifold extending through the cylinder head and in fluidic communication with the secondary cylinders, the first exhaust manifold separate from the second exhaust manifold.

16. The method of claim 12, where the second operating condition is when a driver requested torque is less than a threshold value.

17. The method of claim 12, where the two primary cylinders include a first primary cylinder and a second primary cylinder and the two secondary cylinders include a first secondary cylinder and a second secondary cylinder, the first primary cylinder, the second primary cylinder, the first secondary cylinder, and the second secondary cylinder are consecutively arranged in a longitudinal direction in the engine and where the successive firing order of the cylinders during the first operating condition is the second primary cylinder, the first secondary cylinder, the first primary cylinder, and the second secondary cylinder.

18. The method of claim 12, where the two primary cylinders include a first primary cylinder and a second primary cylinder and the two secondary cylinders include a first secondary cylinder and a second secondary cylinder, the first primary cylinder, the second primary cylinder, the first secondary cylinder, and the second secondary cylinder are consecutively arranged in a longitudinal direction in the engine and where the successive firing order of the cylinders during the first operating condition is the second primary cylinder, the second secondary cylinder, the first primary cylinder, and the first secondary cylinder.

* * * * *